Figure 1:
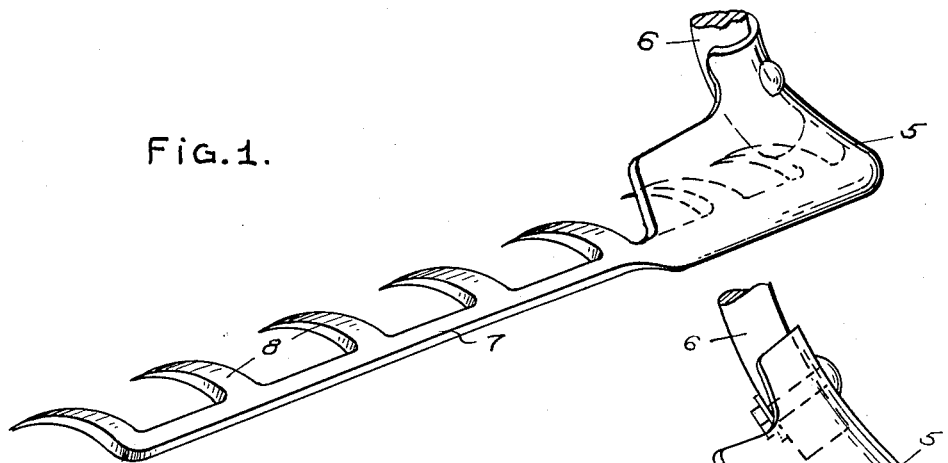

Dec. 13, 1955 K. W. PARKS 2,726,592
CULTIVATOR
Filed Aug. 20, 1954

INVENTOR.
KING W. PARKS,
BY
ATTORNEY.

United States Patent Office 2,726,592
Patented Dec. 13, 1955

2,726,592

CULTIVATOR

King W. Parks, Delray Beach, Fla.

Application August 20, 1954, Serial No. 451,084

1 Claim. (Cl. 97—204)

This invention relates to cultivators and has particular reference to a cultivator capable of being so mounted with respect to its supporting structure as to successfully engage and cultivate the ground beneath row crops of leafy nature without in any way disturbing or injuring the crops.

An object of the invention is to provide a tooth cultivator that may be employed in pairs for successfully cultivating beneath a single row crop or to be separated to permit cultivation beneath a double row crop.

A further object of the invention resides in a toothed cultivator that is angularly arranged and adapted to be supported upon a conventional wheel farm machine in a manner to permit the adjustment of the device as to elevation and, when used in pairs, to permit the lateral adjustment in accordance with the particular crops to be cultivated.

Novel features of construction, arrangement of parts and mode of operation will be more clearly apparent during the course of the following description, reference being had to the accompanying drawings, wherein has been illustrated a preferred form of the device and wherein like characters of reference are employed to denote like parts throughout the several figures.

Figure 2:
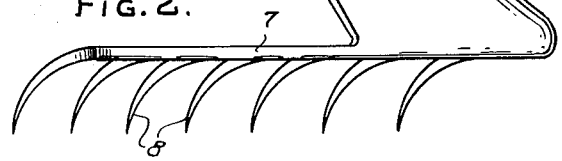
Figure 3:
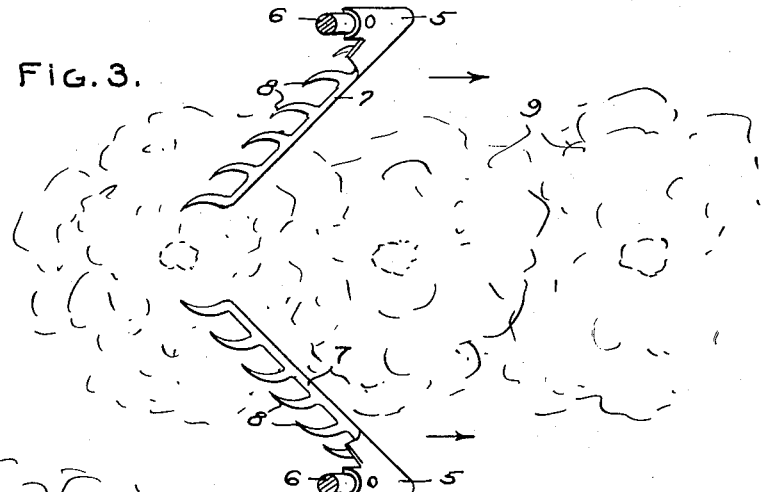
Figure 4:
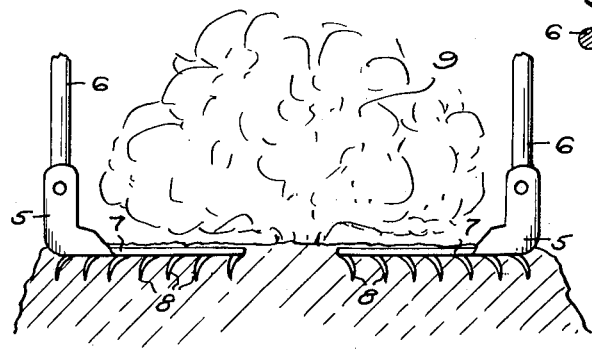

In the drawings:

Figure 1 is a perspective view of a cultivator constructed in accordance with the invention, Figure 2 is a side elevation thereof, Figure 3 is a top plan view of a pair of co-acting cultivators simultaneously employed for cultivating upon opposite sides and beneath a single row crop, and Figure 4 is a front elevation of a pair of row crop cultivators in use.

Referring specifically to the drawings, the numeral 5 designates a cultivator head that is attached to the conventional implement bar 6 commonly employed in conventional cultivating machines presently in use, and through the medium of which the cultivator may be elevated or lowered as desired.

The head 5 is provided with a preferably integral angulated bar 7 that is provided with a plurality of rearwardly curved spaced apart teeth 8. The bar 7 is flush with the lower end of the head 5 and, in use, is disposed in a horizontal plane. As clearly shown, the teeth 8 while being rearwardly curved are also downwardly curved producing in effect a rack-like device that is adapted to engage within the soil adjacent to and beneath the row crop, generally indicated at 9 when used in pairs as shown in Figures 3 and 4. It will be apparent that the cultivators are formed in both right and left hand forms so as to sweep the area adjacent to and to within a predetermined distance of the stalk of the plant. The bars 7 are angled rearwardly from the head 5 and travel in the direction indicated by the arrow in Figure 3.

In the use of the device, the head 5 is rigidly attached to a pre-determined cultivator bar 6 in accordance with the particular crop to be cultivated and the spacing of the cultivators is such as to dispose each cultivator upon opposite sides of a row crop whereby the terminal end of the cultivator will be spaced a pre-determined distance from the stalk of the plant. The elevating mechanism of the cultivating machine is then adjusted vertically to a point where the bars 7 will engage slightly beneath the surface of the ground. After the adjustment has been completed, the cultivating machine is operated to move forwardly in the direction of the arrow, causing the bars 7 and their teeth 8 to engage and thoroughly cultivate the area upon opposite sides of and beneath the foliage of the crops, raking grass, roots and the like successfully from the ground. The device is particularly effective in cultivating crops that are grown in hills and successfully maintains the surface of the hills free from objectionable weeds and grass. Where the co-operating cultivators are employed for cultivating double row crops, the devices are spaced accordingly to cultivate only upon the outer sides and beneath the opposite rows. This is particularly true in double row crops having heavy foliage requiring little, if any, cultivation between the rows. Where the crops are grown in hills, as illustrated in Figure 4, suitable hillers are employed upon the cultivating machine for engaging and maintaining the sides of the hills in proper condition against the washing away of the dirt. Such hillers will be disclosed in a separate application for patent. The cultivators here described are formed of suitable tool steel calculated to have adequate strength and to successfully retain the ends of the teeth 8 sharp over a long period of use. The device is novel in construction, is easily and quickly mounted upon the machine and adjusted, both vertically and laterally. It will of course be apparent that while it is desirable that the cultivators be employed in pairs, such as that illustrated, a single cultivator may be employed, if so desired. The cultivators here disclosed in actual use have been most successful in maintaining the crop rows free from weeds and the like and permit such cultivation in a minimum of time and at a very considerable saving in labor costs.

It is to be understood that while a preferred form of the device has been shown and described, changes are contemplated in the angularity of the bars 7 and the curvature of the teeth 8 as readily fall within the spirit of the invention as determined by the scope of the subjoined claim.

Having described my invention, what I claim as new and desire to secure by Letters Patent is:

A cultivator for use with a draft device whereby the cultivator is adjustable vertically and laterally and whereby the cultivator may traverse a plant row in a manner to engage and cultivate the ground beneath the foliage of the plants, the cultivator comprising a head portion that is detachably connected with an implement bar of the draft device, the head portion being provided with an integral rearwardly extending and inwardly angulated bar that extends from the head in a horizontal plane to be disposed beneath the foliage of the plants, the angulated bar being provided with a plurality of integral ground engaging cultivating teeth for substantially its full length and with the teeth being rearwardly curved.

References Cited in the file of this patent

UNITED STATES PATENTS

| 139,750 | Zocher | June 10, 1873 |
| 467,415 | Hurley et al. | Jan. 19, 1892 |
| 755,295 | Heard | Mar. 22, 1904 |
| 2,048,054 | Bwin et al. | July 21, 1936 |